UNITED STATES PATENT OFFICE 2,392,739

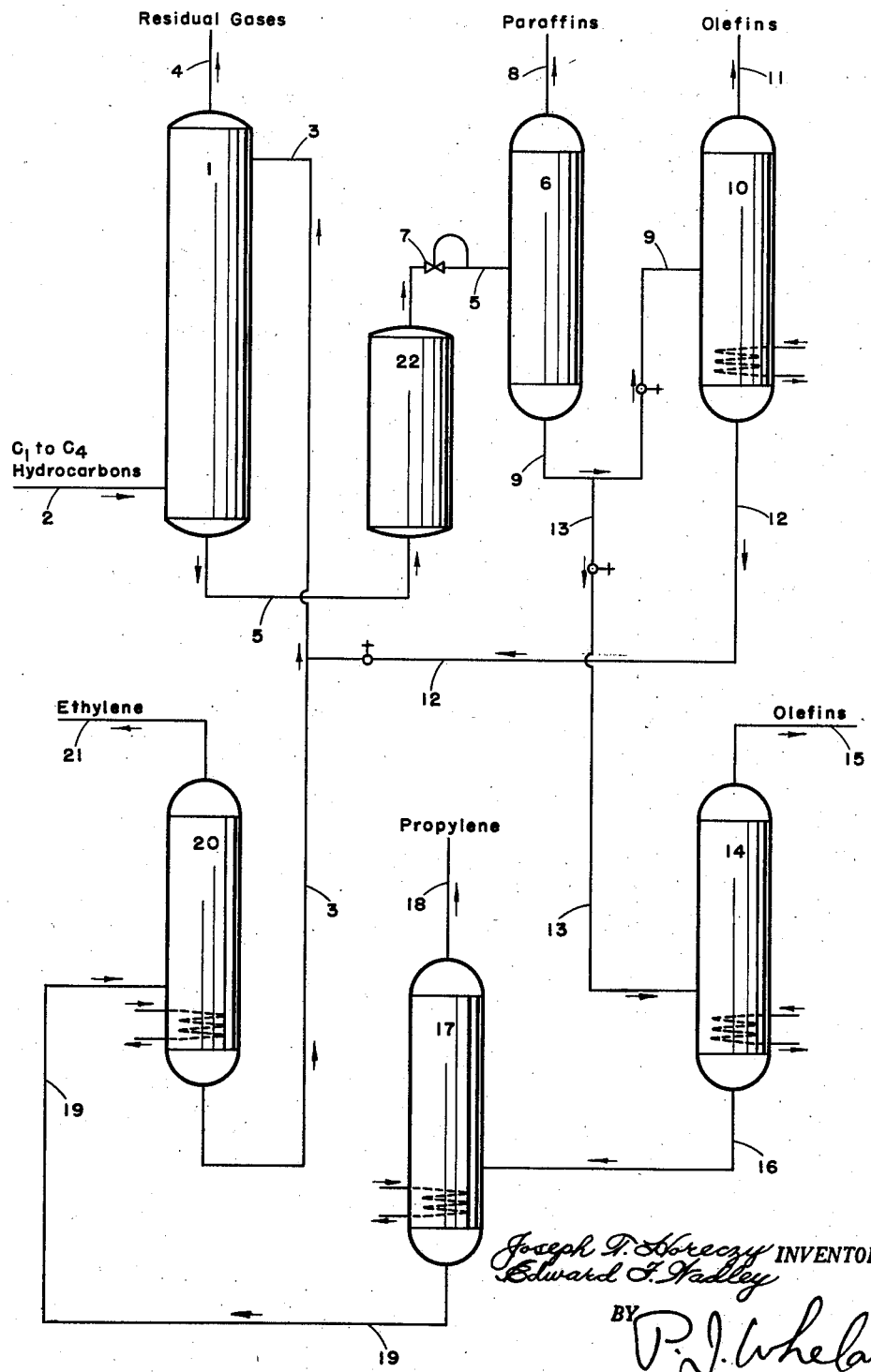

SEGREGATION OF OLEFINS

Joseph T. Horeczy and Edward F. Wadley, Baytown, Tex., assignors to Standard Oil Development Company, a corporation of Delaware Application October 2, 1944, Serial No. 556,743

6 Claims. (Cl. 260—677)

The present invention is directed to a method for separating gaseous olefins from admixtures thereof with gaseous paraffins and, if desired, separating the mixture of gaseous olefins into its individual components. Many processes have been developed which utilize gaseous olefins as starting materials. Alkylation, isomerization, polymerization and alcohol production are illustrations of such processes. In many of these processes it is desirable to use a substantially pure olefinic feed. Thus, in the production of ethyl alcohol from ethylene it is highly undesirable to have the ethylene contaminated with propylene, because this would result in the simultaneous production of isopropyl alcohol, the separation of which from ethyl alcohol is practically impossible. These mixed olefins can be separated into their individual constituents by fractionation, but this is a difficult and costly process.

According to the present invention gaseous olefins are separated from admixtures thereof with gaseous paraffins by contacting the mixed gas with an iodine solution in a mutual solvent for iodine and aliphatic hydrocarbons under conditions suitable for conversion of the olefins into the corresponding di-iodides, separating the residual gas from the solution containing the di-iodides, heating the solution to drive off absorbed hydrocarbons and thereafter heating the solution to a higher temperature to decompose the alkyl di-iodides. In the preferred form of the present invention the latter heating step is conducted in stages at increasing temperatures to decompose the alkyl di-iodides in sequence so that the olefins are recovered separately.

The present invention may be more clearly understood from the following detail description of the accompanying drawing, in which the single figure is a front elevation, partly in diagrammatic form, of one type of plant suitable for the practice of said invention.

Referring to the drawing in detail, numeral 1 designates a tower of the type commonly used for the scrubbing or absorption of gases. Such towers are conventionally provided with interior contact equipment, such as bubble cap plates, disc and doughnut plates, Raschig rings or the like. The mixture of gases containing olefins and paraffins is introduced near the bottom of tower 1 through line 2. This gas mixture will ordinarily be a refinery gas containing $C_1$ to $C_4$ hydrocarbons, both saturated and unsaturated, and hydrogen. Into the top of tower 1 is injected or sprayed by way of line 3 a solution of iodine in a solvent for aliphatic hydrocarbons. As suitable solvents for this purpose may be mentioned toluene, the xylenes, α-methylnaphthalene, carbon bisulfide, etc. The solvent employed will determine the amount of iodine capable of being dissolved at any given temperature. Iodine concentrations of 25 grams per liter to 500 grams per liter of solution may be employed. In general, it is preferred to use solvents which have the greater solvent power for iodine. The solvent should be selected with regard to the olefinic content of the gas mixture, it being important that the solvent will dissolve sufficient iodine to provide a molar excess over the molar content of the olefins in the feed gas.

The tower 1 is maintained under conditions suitable for the reaction of iodine with the olefins in the feed gas. A temperature between the range of 75° to 250° F. and a pressure between about 75 pounds and 150 pounds per square inch may be maintained. Preferably, the temperature will be between about 90° and 120° F. The higher the temperature employed, the higher must be the pressure.

The residual gas leaves the top of tower 1 through line 4. This gas will contain hydrogen and $C_1$, $C_2$ and $C_3$ paraffins. The bulk of the $C_4$ paraffins will be absorbed by the solvent.

The solution of iodides containing absorbed hydrocarbons is conducted from the bottom of tower 1 by way of line 5 to an intermediate portion of a flash tower 6. In transit, the solution may pass through a pressure release valve 7, which reduces the pressure to a point sufficiently low to release the absorbed hydrocarbons at the prevailing temperature. If desired, however, the pressure may be maintained at the reaction level and the desorption effected by application of heat. To insure complete reaction of the olefins with the iodine solution, a soaking drum or time tank 22 may be provided in line 5 ahead of valve 7. The gases liberated in tower 6 will be predominantly $C_2$, $C_3$ and $C_4$ paraffins, and leave the top of the tower through line 8.

The residual solution of di-iodides is drawn off from the bottom of tower 6 through line 9 and discharged into an intermediate portion of the decomposition tower 10, in which conditions suitable for the decomposition of the alkyl di-iodides are maintained. The temperature in this tower may be between about 175° and 500° F., a temperature between about 250° and 350° F. being preferred. If the pressure is considerably lower than that in the reaction zone, the temperature may be in the range of reaction temperature. The lower the pressure, the lower may be the temperature. The olefins liberated by the decomposition of the di-iodides leave the top of tower 10 through line 11, while the regenerated solution of iodine is returned from the bottom of tower 10 to line 3 by line 12.

In the preferred specific embodiment of the present invention the iodide solution from tower 6 is transferred from line 9 by way of line 13 to a decomposition tower 14, in which is maintained a temperature suitable for the decomposition of butylene iodide. This temperature may be within the range of about 75° to 150° F. It will be higher than the temperature in tower 1 at a comparable pressure, but may be lower at lower pressures. The liberated C₄ olefins leave the top of tower 14 through line 15, while the residual iodide solution is drawn off from the bottom of tower 14 through line 16 and discharged into a second decomposition tower 17, in which are maintained conditions suitable for the decomposition of propylene iodide. This involves the maintenance of a temperature in this tower between about 150° and 250° F., preferably in the neighborhood of 200° F. Again the temperature here will be higher than that in tower 14 at a comparable pressure, but may be the same or lower at a lower pressure. The liberated propylene leaves the top of tower 17 through line 18, while the residual iodide solution leaves the bottom of the tower through line 19, which conducts it to tower 20. The temperature in tower 20 is preferably in the neighborhood of 350° F., but may be between 250° and 500° F., depending on the pressure. The liberated ethylene leaves the top of this tower through line 21, while the regenerated iodine solution leaves the bottom of the tower through line 3.

The nature and objects of the present invention having been thus described, what is claimed as new and useful and is desired to be secured by Letters Patent is:

1. A method for separating gaseous olefins from gaseous paraffins which comprises contacting a gas mixture of the two with a solution of iodine in a solvent for aliphatic hydrocarbons at a temperature and under a pressure suitable for reaction between the iodine and the olefins, separating the solution of iodides from the residual gas, subjecting the solution to a treatment suitable for the expulsion of absorbed hydrocarbons without affecting the iodides and then subjecting the solution to conditions suitable for the decomposition of the iodides to thereby liberate the olefins.

2. A method for separating gaseous olefins from gaseous paraffins and from each other which comprises contacting a gas mixture of olefins and paraffins with a solution of iodine in a solvent for aliphatic hydrocarbons at a temperature and under a pressure suitable for reaction between the iodine and the olefins, separating the solution of iodides from residual gas, subjecting the solution to a treatment suitable for the expulsion of absorbed hydrocarbons without affecting the iodide, and then subjecting the solution in successive stages to conditions suitable for the decomposition of individual iodides contained therein with separation of the liberated olefin after each stage.

3. A method for separating gaseous olefins from gaseous paraffins which comprises contacting the gas mixture of the two with a mutual solvent for aliphatic hydrocarbons and iodine containing an excess of iodine over that required to react with the olefins to produce iodides thereof at a temperature between about 75° and 250° F. and under a pressure between about 75 pounds and 150 pounds per square inch to thereby effect reaction between the iodine and the olefins, separating the solution of iodides from the residual gas, subjecting the solution to a treatment suitable for the expulsion of absorbed hydrocarbons without affecting the iodides, and then subjecting the solution to conditions suitable for the decomposition of the iodides to thereby liberate the olefins.

4. A method according to claim 3 in which the decomposition of the iodides is conducted in stages of increasing intensity with separation of liberated olefin between the stages to thereby permit the recovery of individual olefins.

5. A method according to claim 1 in which an iodine solution is recovered from the decomposition stage and returned to the contact stage.

6. A method for separating gaseous olefins from gaseous paraffins which comprises establishing a circulating stream of a solution of iodine in a solvent for aliphatic hydrocarbons, maintaining a portion of said stream at a temperature and pressure suitable for reaction between iodine and olefins, maintaining a later portion of said stream at a temperature and pressure suitable for the decomposition of olefin iodides, contacting the gas mixture containing olefins and paraffins with the first portion of said stream, removing residual paraffins from said stream and recovering olefins from said later portion of said stream.

JOSEPH T. HORECZY.
EDWARD F. WADLEY.